United States Patent
van Giesen et al.

(10) Patent No.: US 10,027,274 B2
(45) Date of Patent: Jul. 17, 2018

(54) MODULAR ROOF COVERING ELEMENT, MODULAR ROOF COVERING, AND ROOF

(71) Applicants: SAUDI BASIC INDUSTRIES CORPORATION, Riyadh (SA); SABIC GLOBAL TECHNOLOGIES B.V., Bergen op Zoom (NL)

(72) Inventors: Roland van Giesen, Geleen (NL); Henrica Steenbakkers-Menting, Geleen (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/124,063

(22) PCT Filed: Mar. 5, 2015

(86) PCT No.: PCT/EP2015/054603
§ 371 (c)(1),
(2) Date: Sep. 7, 2016

(87) PCT Pub. No.: WO2015/132336
PCT Pub. Date: Sep. 11, 2015

(65) Prior Publication Data
US 2017/0019061 A1     Jan. 19, 2017

(30) Foreign Application Priority Data

Mar. 7, 2014   (EP) ..................................... 14158244
Mar. 7, 2014   (EP) ..................................... 14158245

(51) Int. Cl.
*H02S 20/25*     (2014.01)
*H02S 20/23*     (2014.01)
(Continued)

(52) U.S. Cl.
CPC ................ *H02S 20/25* (2014.12); *E04D 1/30* (2013.01); *E04D 13/17* (2013.01); *H02S 20/23* (2014.12);
(Continued)

(58) Field of Classification Search
CPC ..... E04D 1/30; E04D 13/17; E04D 2001/309; H02S 20/23; H02S 20/25; H02S 40/32;
(Continued)

(56) References Cited

U.S. PATENT DOCUMENTS 5,036,833 A *   8/1991   Quigley .................... F24J 2/045
                                                        126/621
6,245,987 B1 *   6/2001   Shiomi .................. H01L 31/048
                                                        136/244

(Continued)

FOREIGN PATENT DOCUMENTS

DE        102010019815 A1    11/2011
DE        102014111926 A1 *   2/2015  ............... E04B 7/22
(Continued)

OTHER PUBLICATIONS

Machine translation of Foreign reference DE 10 2014 111 926, obtained from http://translationportal.epo.org/emtp/translate/?ACTION=description-retrieval&COUNTRY=DE&ENGINE=google&FORMAT=docdb&KIND=A1&LOCALE=en_EP&NUMBER=102014111926&OPS=ops.epo.org/3.2&SRCLANG=de&TRGLANG=en (last accessed on Apr. 11, 2017).*

(Continued)

*Primary Examiner* — Theodore V Adamos
(74) *Attorney, Agent, or Firm* — Cantor Colburn LLP

(57) ABSTRACT

Roof (2), at least in part covered by a modular roof covering, said modular roof covering comprising a plurality of modular elements (1) for covering said roof, wherein the plurality (Continued)

Figure 1:
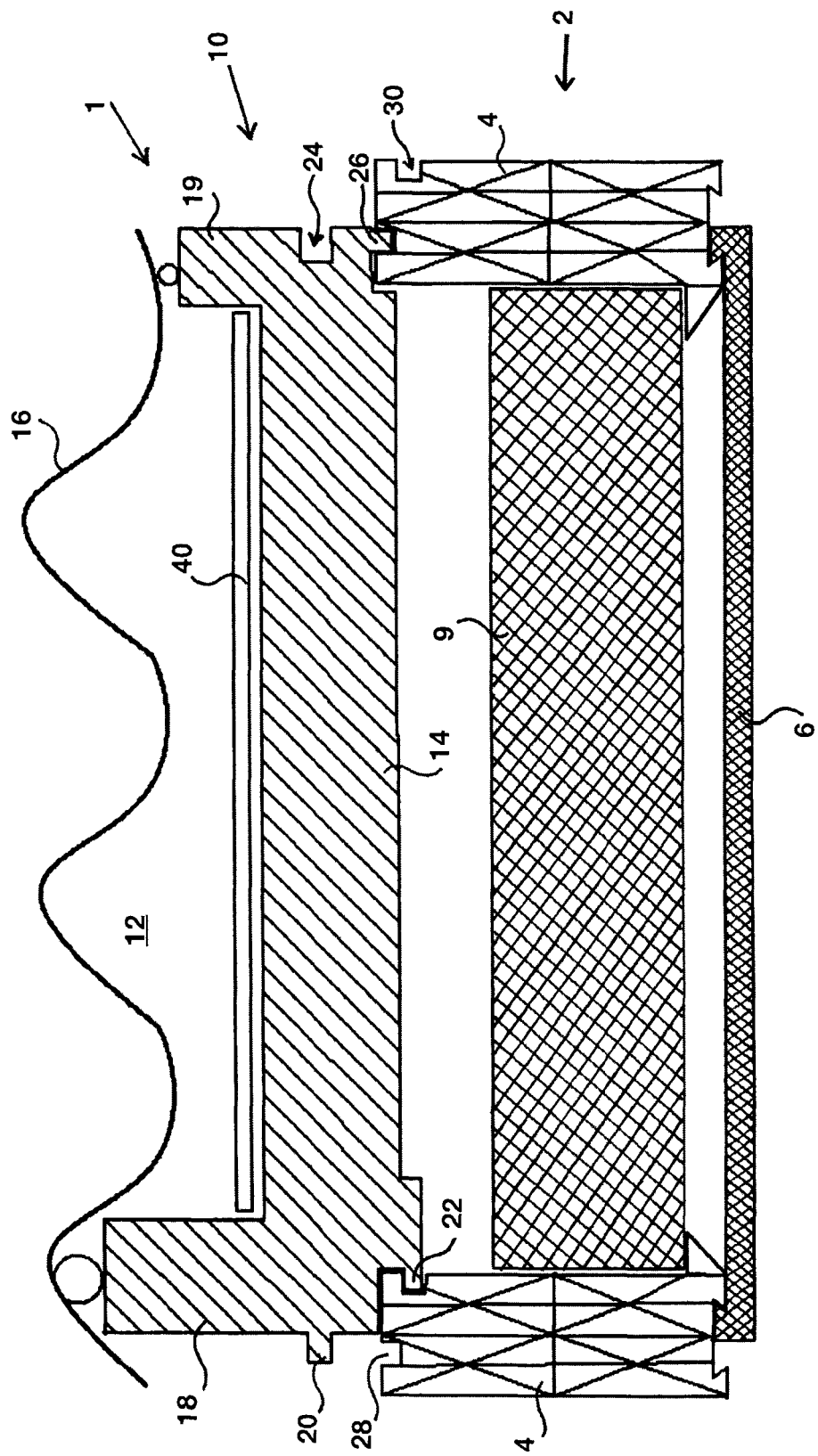

of elements is arranged such that at least part of a roof is fully covered by the plurality of elements, and wherein each element is coupled via coupling means to at least one adjacent further element of the plurality of elements, and the roof having sloped rafters (4) extending mutually parallel to a roof ridge, wherein the plurality of elements is directly mounted onto rafters, wherein preferably each element is supported, in a direction transverse to the rafters, onto two neighboring rafters.

20 Claims, 9 Drawing Sheets

(51) Int. Cl.
　　　*H02S 40/32*　　　(2014.01)
　　　*E04D 1/30*　　　(2006.01)
　　　*E04D 13/17*　　　(2006.01)
　　　*F24J 2/04*　　　(2006.01)

(52) U.S. Cl.
　　　CPC ........ *H02S 40/32* (2014.12); *E04D 2001/309* (2013.01); *F24J 2/045* (2013.01); *Y02B 10/12* (2013.01); *Y02B 10/14* (2013.01); *Y02B 10/20* (2013.01)

(58) Field of Classification Search
　　　CPC .......... F24J 2/045; Y02B 10/14; Y02B 10/20; Y02B 10/12
　　　USPC .................. 52/173.3; 136/251; 126/621, 622
　　　See application file for complete search history.

(56) References Cited

U.S. PATENT DOCUMENTS

| | | | |
|---|---|---|---|
| 6,294,724 B1 | 9/2001 | Sasaoka et al. | |
| 6,489,552 B2* | 12/2002 | Yamawaki | E04D 1/30 136/244 |
| 8,272,177 B2 | 9/2012 | Jousse et al. | |
| 8,375,653 B2 | 2/2013 | Shiao et al. | |
| 2006/0277845 A1* | 12/2006 | Warfield | F24J 2/46 52/173.1 |
| 2008/0302030 A1* | 12/2008 | Stancel | H01L 31/02008 52/173.3 |
| 2009/0000222 A1 | 1/2009 | Kalkanoglu et al. | |
| 2009/0078299 A1* | 3/2009 | Cinnamon | F24J 2/5211 136/244 |
| 2010/0043319 A1* | 2/2010 | Bennett | E04D 1/30 52/173.3 |
| 2010/0154327 A1* | 6/2010 | Reyal | H01L 31/02008 52/173.3 |
| 2010/0275532 A1* | 11/2010 | De Nardis | E04D 1/28 52/173.3 |
| 2011/0155220 A1* | 6/2011 | Lee | H02S 20/25 136/251 |
| 2011/0162299 A1* | 7/2011 | Azzolini | E04B 5/026 52/173.3 |
| 2011/0162639 A1* | 7/2011 | Jeandeaud | F24J 2/4645 126/634 |
| 2011/0252724 A1* | 10/2011 | Heisler | E04B 7/022 52/173.3 |
| 2011/0267855 A1* | 11/2011 | Chapman | H02J 3/383 363/74 |
| 2011/0289867 A1* | 12/2011 | Balbo Di Vinadio | E04D 1/04 52/173.3 |
| 2011/0320953 A1 | 12/2011 | Chen et al. | |
| 2012/0111407 A1 | 5/2012 | Rummens | |
| 2012/0151856 A1 | 6/2012 | Azoulay | |

FOREIGN PATENT DOCUMENTS

| | | |
|---|---|---|
| EP | 2390093 A1 | 11/2011 |
| JP | 6055650 A | 3/1985 |
| JP | 09273279 A | 10/1997 |
| WO | 9917379 A1 | 4/1999 |
| WO | 0030184 A1 | 5/2000 |
| WO | 2008082600 A1 | 7/2008 |
| WO | 2009137348 A2 | 11/2009 |
| WO | 2012082604 A1 | 6/2012 |
| WO | 2013133760 A1 | 9/2013 |

OTHER PUBLICATIONS

"Chinaplas 2013 China Import and Export Fair Complex (Pazhou)," May 23, 2013 Retrieved from the Internet: URL: http://chinaplasonline.com/CPS13/Mobile/Home/lang-eng/Event_Concepthouse.aspx; Retreived on Aug. 30, 2016, 5 Pages.
International Search Report for International Application No. PCT/EP2015/054603; International Filing Date: Mar. 5, 2015; dated Jun. 3, 2015; 6 Pages.
Machine Translation of DE102010019815(A1); Date of Publication: Nov. 10, 2011; 7 Pages.
Machine Translation of JP6055650(A); Date of Publication: Mar. 30, 1985; 4 Pages.
Machine Translation of JPH09273279(A); Date of Publication: Oct. 21, 1997; 10 Pages.
Written Opinion of the International Searching Authority for International Application No. PCT/EP2015/054603; International Filing Date: Mar. 5, 2015; dated Jun. 3, 2015; 8 Pages.

* cited by examiner

MODULAR ROOF COVERING ELEMENT, MODULAR ROOF COVERING, AND ROOF

CROSS REFERENCE TO RELATED APPLICATIONS

This application is a 371 of International Application No. PCT/EP2015/054603, filed Mar. 5, 2015, which claims priority to European Application Nos. 14158244.5, filed Mar. 7, 2014 and 14158245.2, filed Mar. 7, 2014 which are incorporated herein by reference in their entirety.

The present invention relates to a modular roof covering element for covering a roof with a plurality thereof.

The invention also relates to a modular roof covering and to a roof, and to a photovoltaic element assembly.

EP-A1 2390093 discloses a multi-layered backsheet for solar modules comprising in this order an optional top layer, an insulating layer, a back layer, wherein between each layer there may or may not be one or more sublayers, wherein the top layer, the insulating layer and the back layer contain a polyolefin as the major component, wherein the polyolefin is selected from polyethene homo- and copolymers (PE's) and polypropene homo- and copolymers (PP's).

U.S. Pat. No. 8,272,177 discloses a solar roofing assembly comprising at least one photovoltaic device, including a front structure and a rear structure; and at least one hot-water solar collector, including a front structure and a rear structure, wherein the respective front structures of the photovoltaic device and of the hot-water solar collector include respective glass substrates forming a cover that has an upper face configured to face an external environment, and, on an opposite side of the cover, an inner face, wherein the respective rear structures of the photovoltaic device and of the hot-water solar collector are placed beneath the cover, facing the inner face, and wherein each of the glass substrates is frameless and the glass substrates are joined together, either directly or separated by transition substrates made of glass, so as to form a uniform unitary glass cover.

U.S. Pat. No. 8,375,653 discloses a photovoltaic roofing element comprising an encapsulated photovoltaic element having a top surface and a bottom surface, a top layer material at its top surface and a bottom layer material at its bottom surface, the bottom layer material at the bottom surface of the encapsulated photovoltaic element having a surface tension no greater than 35 dyne/cm; a roofing substrate having a top surface; and a tie layer system disposed between the encapsulated photovoltaic element and the roofing substrate and joining the bottom surface of the encapsulated photovoltaic element to the top surface of the roofing substrate.

EP-A1 2461973 discloses a multi-layer PV module backsheet.

JP-A 60-55650 discloses a solar battery module.

U.S. Pat. No. 6,294,724 discloses a solar cell module comprising a solar cell element, a front surface member provided at the light receiving surface side of the solar cell element, and a back surface member provided at the back surface side of the solar cell element. The front surface member and the back surface member are adjoined in a releasable state.

WO 2013/133760 discloses a solar collector and solar panel with solar cells for the roof of a building, which solar collector is arranged to, using solar energy, heat water which is supplied to the solar collector and which, via channels or pipes, runs through the solar collector, wherein the solar collector is arranged to supply heated water to the water pipe system of the building, and is characterised in that the solar collector comprises modules of massive material, in that the modules are provided with one or several channels or pipes running inside the modules, in that the material of the modules has a thermal capacity which at least corresponds to a black rubber material, and in that the exterior of the solar collector comprises translucent roofing tiles with a size corresponding to conventional brick roofing tiles, and in that solar panels for generating electrical energy are arranged on the side of the modules facing the roofing tiles.

US 2009/0000222 discloses photovoltaic roofing tiles and their methods of manufacture.

WO 00/30184 discloses a photovoltaic roof tile for creating a roof covering over a roof substructure.

WO-A1 2012082604 discloses a photovoltaic device comprising a three-dimensional multi-layered photovoltaic cell assembly in the form of a panel with at least a top surface, a bottom surface, and a peripheral edge, further including a barrier layer, the assembly including at least one electrical connector assembly with a housing, the housing having an outer surface; a frame assembly, wherein the frame assembly is at least partially surrounding a portion of the top surface and peripheral edge of the three-dimensional multi-layered photovoltaic cell assembly; and an interconnecting structural member at least partially disposed between the barrier layer and the housing of the at least one electrical connector assembly.

EP-A2 2513974 discloses a substantially two-dimensional construction element for construction, comprising a solar energy converter member extending along and defining one surface of said construction element and providing for solar energy conversion; a building construction member, extending along and defining the second surface of said construction element and providing for construction requirements. At least a part of said converter member is integral with at least a part of said construction member and said resulting integral part both contributes to said solar energy conversion and to said construction requirements.

WO-A2 2009/137348 discloses a photovoltaic device comprising a photovoltaic cell assembly including at least one peripheral edge, at least one photovoltaic cell inboard of the at least one peripheral edge, a photoactive portion, and at least one buss terminal for transferring current to or from the photovoltaic cell assembly, the at least one photovoltaic cell including a surface that allows transmission of light energy to the photoactive portion for conversion into electrical energy; a body portion including lower surface portion that contacts a building structure, and an upper surface portion that receives a fastener that attaches the photovoltaic device to the building structure; wherein the body portion is at least partially joined to at least one edge portion of the photovoltaic cell assembly along at least a portion of a bottom segment of the body portion while leaving the surface of the at least one photovoltaic cell exposed, and further wherein the body portion includes a locator adapted to locate the photovoltaic device relative to another photovoltaic device during installation of the device on the building structure.

WO-A1 1999/017379 discloses a method of manufacturing a solar cell module comprising providing a front support layer, a transparent encapsulant layer, a plurality of interconnected solar cells and a backskin layer, at least one of the transparent encapsulant layer and the backskin layer being predisposed to electron beam radiation; placing the transparent encapsulant layer adjacent a rear surface of the front support layer formed of light transmitting material; positioning the interconnected solar cells adjacent a rear surface of the transparent encapsulant layer to form an assembly; and placing the backskin layer adjacent a rear surface of the assembly.

US-A1 2012/0151856 discloses a photovoltaic tile for a roof comprising a plurality of said tiles, at least two adjacent tiles of which at least partially overlap each other, including a body having overlapping edges constituting a top edge and a bottom edge, the top edge being formed so as to cover the bottom edge of at least one of the adjacent tiles, a photovoltaic layer placed on a free part of the upper surface of the body outside the bottom edge, and electrical connectors which are connected to the photovoltaic layer by means of electrical conductors to electrically connect one to another the photovoltaic layers of at least two adjacent tiles of the roof wherein the electrical connectors are provided in assembly elements by nesting, said assembly elements being provided on the overlapping edges so as to enable said overlapping edges to be mutually positioned during the placement of two of the adjacent tiles so that, through the nesting of the assembly elements, the electrical connectors come into electrical contact with each other.

JP-B2 03 524840982 discloses a roof panel having a light power generation function is constituted by arranging a solar battery panel, a waterproof sheet, and a thermal insulation material in order in layers from a surface side and assembling them on a wooden frame integrally. At least two kinds of thermal insulation materials made of different raw materials are used as the thermal insulation material, and the thermal insulation material arranged in an eaves part is constituted by a semi-inflammable or inflammable raw material.

An object of the present invention is to provide a cost efficient and versatile roof covering element.

Said object is achieved by the modular element according to the present invention, for covering a roof with a plurality thereof, comprising
- a box-shaped container having an interior, an at least substantially flat bottom wall which in use faces the roof, and being open on an upper side, and being at least substantially made of a polymer,
- a photovoltaic element which is disposed within the interior of the container,
- a cover for at least substantially covering said open upper side, and being connected to the container, wherein the cover is light transparent to such an extent that in use electrical power can be generated by the photovoltaic cell by due to incident sunlight, and
- coupling means for coupling the element to the roof and/or to a further element, for covering a roof with the plurality of elements.

The term "for covering of a roof" as used herein is to be understood as meaning that the elements of the present invention may be mounted such that a roof is formed. In other words the elements of the present invention do not require the presence of an existing roof on top of which they are to be mounted. That said, the mounting on top of an existing roof structure may be a possible application of the elements according to the present invention. It is preferred however that the elements form the roof. In a further embodiment the elements of the invention may also form part of an existing roof structure wherein the elements and said existing roof structure together form the roof. In other words, the elements of the present invention are integrated with an existing roof structure so as together form the roof.

An advantage of the element according to the present invention, is that a highly versatile covering element is provided which can in dependence on requirements be provided with for example a photovoltaic element within the interior of the element. The cover can be configured such that an aesthetically pleasing outer view is achieved, for example resembling the shape of tiles or having a desired color. Due to the use of a polymer for the container, the container can be manufactured very cost efficient, for example using an injection moulding technique. A roof covering can be provided at low costs, whereby in accordance with for example a required solar power output, a number of elements of the covering can be provided with photovoltaic elements. A roof covering formed by modular elements according to the invention can be easily and quickly installed onto a roof.

The provision of a box-shaped container having an interior results in the possibility to have freedom for design in view of accommodation of various kinds of PV elements and/or have space for an integrated micro-inverter of the PV element.

The roof construction may comprise, in an embodiment, a fast assembly and easy fix system, with for instance U or H profiled beams, having snap fit connection elements, wherein the elements according to the invention in a preferred embodiment, also have snap fit connection elements so as to be able to fix the elements easily and in a robust manner on the roof, and, in an embodiment, to a neighbouring element.

The invention relates in particular to a modular roof covering element. Use of the modular element according to the invention on other construction elements like walls, facades, ground, or as part of a concentrated solar park is however also conceivable.

In an embodiment, the photovoltaic element is formed by a solar module, i.e. a packaged, connected assembly of solar cells being fully covered with an encapsulation layer.

In a further embodiment, the photovoltaic element is formed by a connected plurality of solar cells that are placed in the box-shaped container via positioning of crosses, and covered with an encapsulation layer.

In another embodiment the photovoltaic element is a foil placed inside the container.

In a preferred embodiment the cover is colored. When a commonly used color for roof tiles is chosen, the similarity of a roof covered by a plurality of element according to the invention, and a common roof covered with roof tiles, is very high.

Preferably the cover is in a releasable manner connected to the container. The releasable connection may comprise a snap connection and/or a screw connection. As a result, in use for example the photovoltaic element can be removed from or placed in the interior, without having to exchange the entire modular element.

Preferably, the polymer is a polyolefin, preferably polypropylene, or polyethylene.

In a preferred embodiment, the polymer is a reinforced polymer, preferably a glass fibre reinforced polymer, preferably glass fibre reinforced polypropylene, preferably long glass fibre reinforced polypropylene, denoted as PP-LGF.

In an embodiment, the reinforced polymer is a laminate, or comprises a foamed core. Use of a foamed core increases the heat isolation properties of the modular element. As a result, further roof insulation below the modular element is not required any more, or at least to a decreased extent.

In particular with regard to use of the modular element for covering a roof, it is advantageous if the reinforced polymer is fire retardant, preferably halogen-free flame retardant. In view of use of the element in combination with a photovoltaic element, the reinforced polymer is preferably heat resistant.

Preferably, the cover comprises a plastic chosen from the group consisting of PMMA (Poly(methyl methacrylate)), a polycarbonate, PET (Polyethylene terephthalate), polypropylene, and polyethylene, whereby the plastic is preferably UV resistant. In an embodiment, the cover is a multilayer element having layers of plastics chosen from the mentioned group, whereby the lop layer facing away from the container in assembled condition, is preferably UV resistant.

Preferably the transmission, for sunlight, of the cover is at least 50 percent.

In an embodiment, the coupling means are configured for a form-closed coupling of the element to a further element. Said coupling may be a direct mutual coupling between two adjacent elements, by a first coupling element of a first of the two adjacent elements, which couples to a second coupling element or a second of the two adjacent. Alternatively or in combination said coupling may be an indirect coupling between two adjacent elements via a structural roof component such as a roof rafter. The form closed coupling may be a form closed interlocking coupling.

The roof covering element comprises, in an embodiment, sealing means for sealing, for fluids such as rain water, a gap between the element and an adjacent element, preferably along all four sides of the element. In an embodiment, the coupling means are also configured for sealing said gap. Due to this, a plurality of mutually coupled elements forms a closed surface and therefore there are less requirements, as to sealing, of the roof structure below the elements.

In an embodiment, the coupling means are configured for engaging at least one tile batten, so as to place the element on an existing roof instead of for example roof tiles. The coupling means may further be configured to form a fluid-tight seal, or as drain for fluid, between two adjacent. Several interconnected elements may form a drain extending over several elements, for example downwards to a roof gutter.

In an embodiment the photovoltaic cell is exchangeably disposed in the interior of the container.

In an embodiment, the photovoltaic element comprises a plurality of connected photovoltaic cells which are placed on, preferably fixed to, an upper surface, facing the interior, of the bottom wall of the container.

Alternatively, the photovoltaic element comprises a plurality of connected photovoltaic cells which are fixed onto a flexible sheet, whereby the flexible sheet is suspended within the interior of the container. The container may have two opposite side walls which extend from the bottom wall in the direction of the cover, to which side walls the sheet may be connected so as to suspend the sheet in the interior. Alternatively the sheet may be suspended from support elements placed on the upper surface of the bottom wall.

Preferably, the interior of the container is fully surrounded by walls of the container and by the cover. Preferably, the container has four side walls extending from the rectangular bottom wall to the cover. An upper edge of the side walls may be designed to conform to a lower side of the cover, so as to at least substantially close off the interior of the modular element from the surroundings.

The cover may be designed to cover the open upper side of the container such that an air gap is present in between the cover and the container. This results in the possibility to provide for air cooling through the interior, either natural or forced.

In an embodiment the container has an opening in two opposite side walls extending from the bottom wall to the cover, such that in use air can flow through the interior.

In a highly preferred embodiment, the cover has, on its outer, upper, side, the shape and color of a pattern of roof tiles, such as Spanish roof tiles, flat roof tiles, or shingles. Preferably, the cover is designed such as to simulate a plurality of adjacent roof tiles, in two directions of the roof to be covered.

The invention also relates to a modular roof covering, comprising a plurality of modular elements according to the invention, wherein the plurality of elements is arranged such that at least part of a roof is fully covered by the plurality of elements, and wherein each element is coupled via its coupling means to at least one adjacent further element of the plurality of elements.

The invention also relates to a roof, at least in part covered by a modular roof covering according to the invention, the roof having sloped rafters extending mutually parallel to a roof ridge, wherein the plurality of elements is directly mounted onto rafters, wherein preferably each element is supported, in a direction transverse to the rafters, onto two neighbouring rafters. In an embodiment, the rafters are configured such as to facilitate an indirect form closed, preferably interlocking, coupling between two adjacent modular elements according to the invention. The coupling means of the modular element is then arranged to couple the modular element to a further element in a water tight manner, such that the modular roof covering, i.e. the modular elements comprised by the modular roof covering, do not require the presence of an existing roof on top of which it is to be mounted. The modular roof covering is then suitable to be used as a roof, as the modular roof covering is able to withstand all kinds of weather conditions like rain, snow, hail, wind, etc.

Conventionally, for mounting solar panels, for example photovoltaic panels, different types of mounting systems are available, each of which suitable for a certain type of roof. A mounting system for a flat roof may differ from a mounting system suitable for a sloped tiled roof.

A known mounting system comprises a plurality of roof hooks, mounting rails and small components to mount the solar panels on the mounting rails, which mounting system may be used for a (sloped) tiled roof. Here, the roof hooks are fixed to roofing battens of the tiled roof. Roofing battens are used to provide a fixation point for roofing sheet or roof tiles. The orientation and spacing of the roofing battens depend on the type of roof. Battens may be oriented at right angles to the trusses or rafters of a roof.

The location of the solar panels on the roof may be chosen rather freely, as the roof hooks are not fixated on the rafters or trusses. Height variations may be achieved by levelling a height adjustment piece of the roof hooks.

Subsequently, the mounting rails are fixated to the roof hooks, wherein the mounting rails serve as a supporting structure for mounting the solar panels.

Once the mechanical structure of the solar panels on the roof is in place, the solar panels are connected to a converter for converting direct current voltage, to be generated by the solar panels, to an alternating current voltage, such that the alternating current voltage can be transported. As such, a solar panel, and/or a roof, is provided with electrical wiring and electrical connectors to connect the plurality of solar panels to the converter, and for transporting electrical power generated by the solar panels due to incident sunlight.

A drawback of such a known mounting system is that it is cumbersome and time consuming to place the solar panels and the wiring on a roof of a building. A further drawback of the mounting system is the limited life expectancy due to the use of small components, such as solar panel clamps, end clamps, mounting screws, electrical wiring and electrical connectors.

Accordingly, it is another object to provide for a photovoltaic element assembly, and a roof having a plurality of photovoltaic element assemblies, wherein these drawbacks are tackled.

The object is achieved by the photovoltaic element assembly for generating electrical power due to incident sunlight, wherein the photovoltaic element assembly comprising:
- a supporting carrier having a first side and a second side;
- a photovoltaic element disposed on the first side of the supporting carrier and arranged for generating electrical power by a direct current voltage from the incident sunlight;
- a micro converter, connected to the photovoltaic element and arranged for converting the direct current voltage to an alternating current voltage;
- inductive coupling means comprising:
- a supply coil connected to the micro converter, and
- a pickup coil disposed at or near the second side of the supporting carrier and inductively coupled to the supply coil for transferring the electrical power.

The photovoltaic element assembly further comprises the modular element for covering a roof, which has a box-shaped container having an interior, and wherein the supporting carrier, the photovoltaic element, the micro converter and the supply coil are disposed within the interior of the box-shaped container, wherein the second side of the supporting carrier faces a bottom side, formed by the at least flat bottom wall, of the box-shaped container.

An advantage of the photovoltaic element assembly according to the present invention, is that by using inductive coupling means for transporting electrical power generated by the assembly, at least the electric connection of the photovoltaic element assembly is made easier or more simplified.

The inductive coupling means according to the invention, may be construed in a single package and may be referred to as an inductive coupling device. In the context of the present invention, coupling is considered as the transfer of electrical energy from one part of an electrical circuit, such as the micro converter, to another part of an electrical circuit, for example for transferring the electrical power to an electrical storage, such as a battery. In the prior art, electrical power, i.e. electrical energy, is transferred from a solar panel to a battery by means of conductive coupling, i.e. hard-wire coupling.

The inventors noted that for mounting purposes, the use of inductive coupling means is advantageous for a photovoltaic element assembly. In order to obtain an effective inductive coupling, a direct current voltage generated by the photovoltaic element assembly is converted to an alternating current voltage by the micro converter.

Inductive coupling means comprise, amongst other, electrostatic and electrodynamic inductive coupling, electromagnetic coupling, transformer coupling, coil coupling, etc.

The pickup coil is, in use, disposed at or near the second side of the supporting carrier. The pickup coil may be mounted to the supporting carrier or may be mounted on a roof, for example for sloped rafters extending mutually parallel towards a roof ridge.

It was the insight of the inventors in the present application that inductive coupling may be used for photovoltaic element assemblies for transporting energy generated by these assemblies to, for example, a battery.

The energy may be collected on the rafters and transported via roof rafters down for collection.

In an embodiment, the photovoltaic element assembly further comprises a box-shaped container having an interior, and wherein the supporting carrier, the photovoltaic element, the micro converter and the supply coil are disposed within the interior of the box-shaped container, wherein the second side of the supporting carrier faces a bottom side of the box-shaped container.

The advantage hereof is that a roof may be arranged with a plurality of pickup coils, well before the box-shaped containers are mounted to the roof. Once these pickup coils are mounted, the box-shaped containers, each comprising a photovoltaic element, can be easily mounted on the roof as no attention needs to be paid to the electrical connection of the photovoltaic element. This, because an inductive coupling is automatically present between the pickup coil and the supply coil once the box-shaped container is mounted to the roof.

A further advantage of this embodiment is that at least the pickup side of inductive coupling means is protected against any type of moisture, such as rain, thereby preventing any form of corrosion to the pickup coil Preferably, the inductive coupling means further comprise a core, wherein the core is penetrating the bottom side of the box shaped container, and wherein the supply coil is wounded around the cored within the interior of the box-shaped container and the pickup coil is wounded around the core at an outside of the interior of the box-shaped container, i.e. the exterior.

The advantage hereof is that the efficiency of the inductive coupling between the supply coil and the pickup coil is increased, as the core material increases the magnetic flux of the inductive coupling means. Preferably, the core material is made of ferromagnetic material, such as iron or ferrite.

In another embodiment, the supporting carrier, the photovoltaic element, the micro converter are exchangeably disposed in the interior of the box-shaped container. In another option, the supply coil may also be exchangeably disposed in the interior.

The inventors noted that, as no attention needs to be drawn to the electrical connection of the photovoltaic element, the supporting carrier, the photovoltaic element, and the micro converter may be exchangeably disposed in the interior of the box-shaped container for further simplifying the mounting of the assembly to the roof. In such a case, a box-shaped container may be mounted on a roof before these delicate elements are placed within its interior, resulting in more certainty that these delicate elements are not affected or even destroyed during the mounting process.

In another example, the supply coil is assembled in the bottom side of the box-shaped container, for example in substantially a circumferential direction of the bottom side. In the context of the present invention, in substantially a circumferential direction of the bottom side indicates that the supply coil is formed by an electrical conductor element, such as a wire, circumferential to, i.e. extending near the edges of the bottom side of the box-shaped container. As such, a large area of the bottom side is enclosed by, i.e. encompassed by the supply coil, resulting in a more efficient inductive coupling to the pickup coil.

In an example, the supply coil is moulded in the bottom side of the box-shaped container or the supporting carrier.

In another example, the supply coil, i.e. the package comprising the supply coil, is mounted on the bottom side of the box-shaped container.

In a further example, the assembly further comprises transportation means connected to the pickup coil and arranged for transporting the inductively coupled electrical power, for example to a electrical storage such as a battery.

Preferably, the transportation means comprise a converter for converting an alternating current voltage inductively coupled to the pickup coil to a direct current voltage.

The pickup coil, according to the present invention, may be mounted on a bottom side of the box-shaped container or may be pre-mounted on a roof. The advantage of mounting the pickup coil to the roof is that pickup coils only need to be mounted at locations where a photovoltaic element assembly comprising a box-shaped container is to be placed.

The photovoltaic element, according to the present invention, may comprise a plurality of photovoltaic cells. The protection of these cells, for example against rain, is preferably formed by a cover placed on top of the box-shaped container.

In an example, the supporting carrier comprises a flexible sheet, whereby the flexible sheet is suspended within the interior of the box-shaped container. The container may have two opposite side walls which extend from the bottom wall in the direction of the cover, enclosing an interior, to which side walls the sheet may be connected or mounted so as to suspend the sheet in the interior. Alternatively the sheet may be suspended from support elements placed on the upper surface of the bottom wall. The invention also relates to a roof, at least in part covered by a plurality of photovoltaic element assemblies according to the present invention, the roof having rafters extending mutually parallel towards a roof ridge, wherein the plurality of photovoltaic element assemblies is mounted onto rafters, wherein a plurality of pickup coils is mounted on the rafters.

Figure 2:
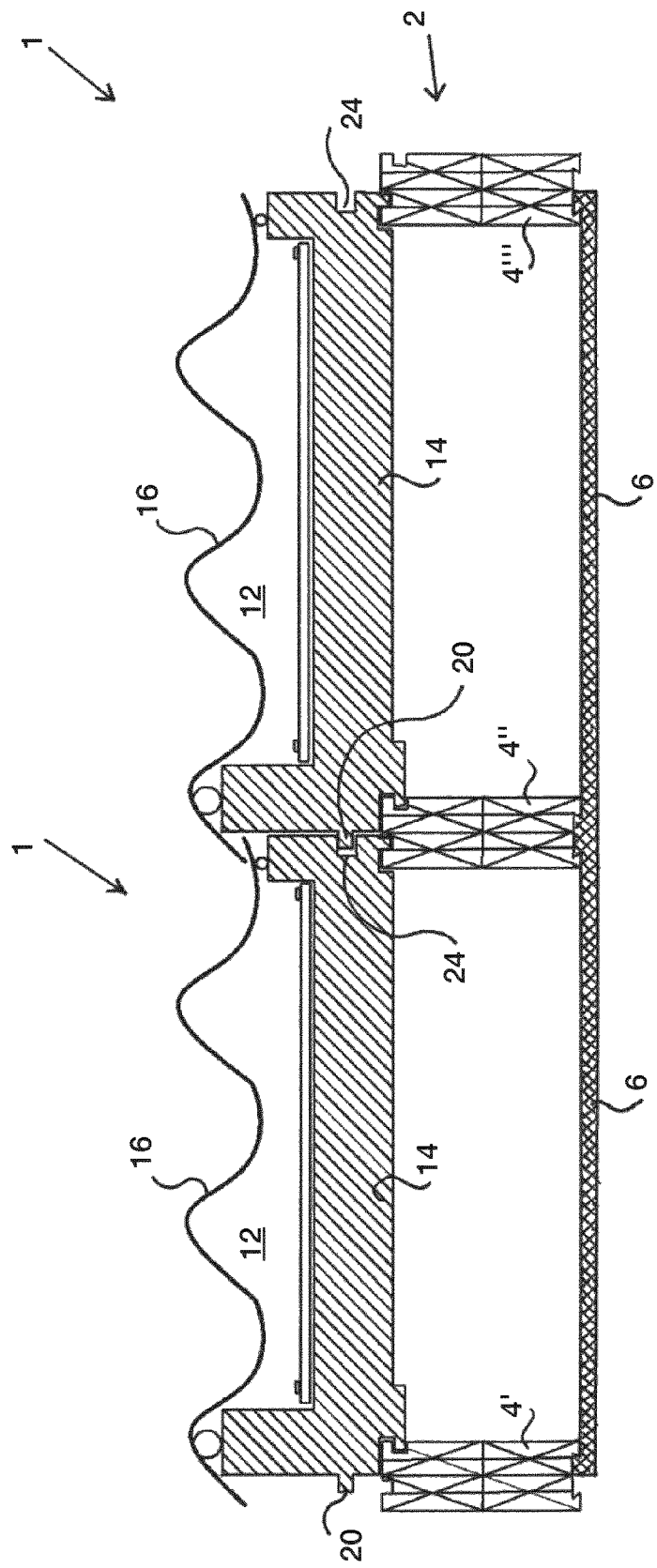
Figure 3:
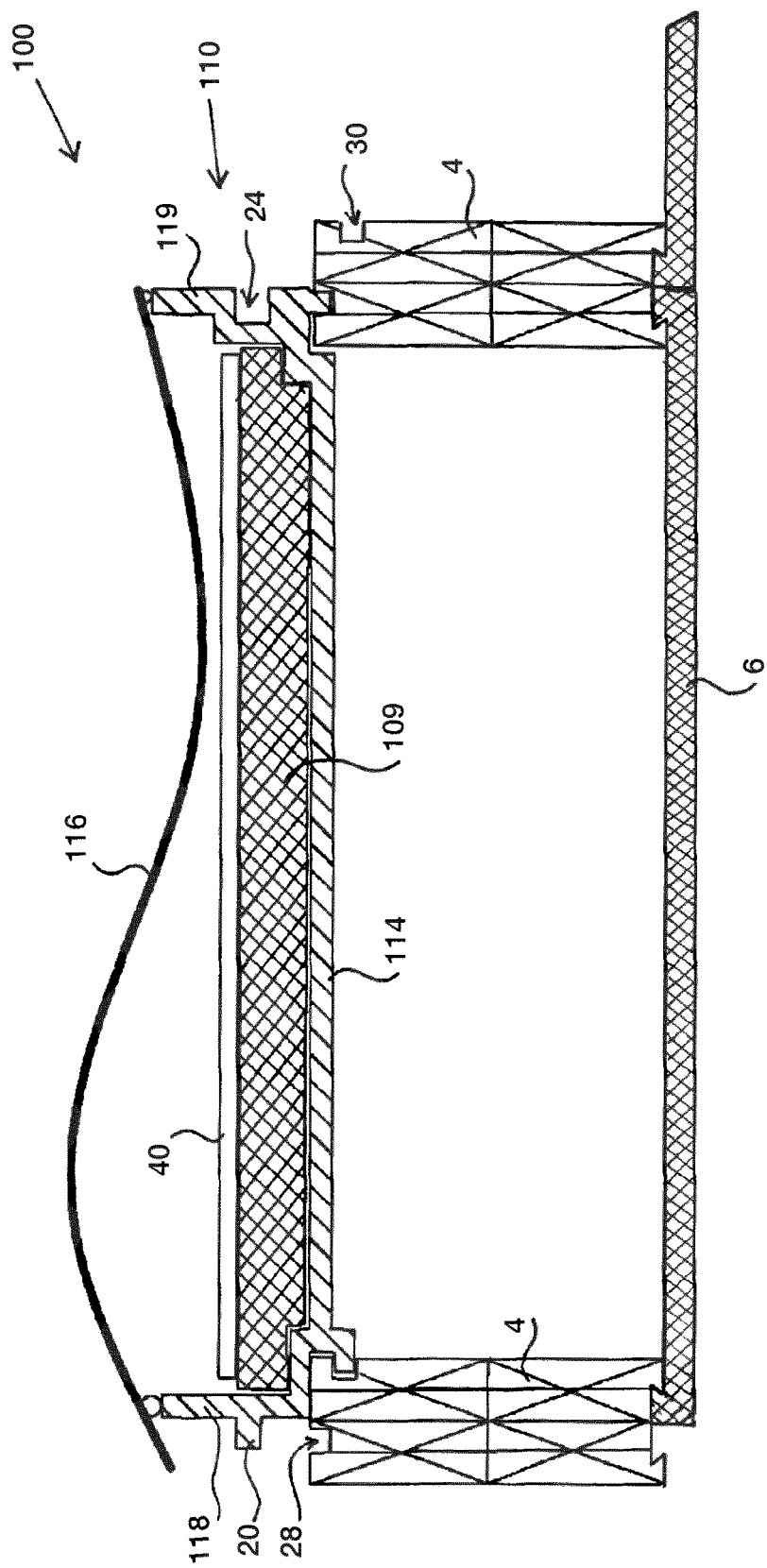
Figure 4:
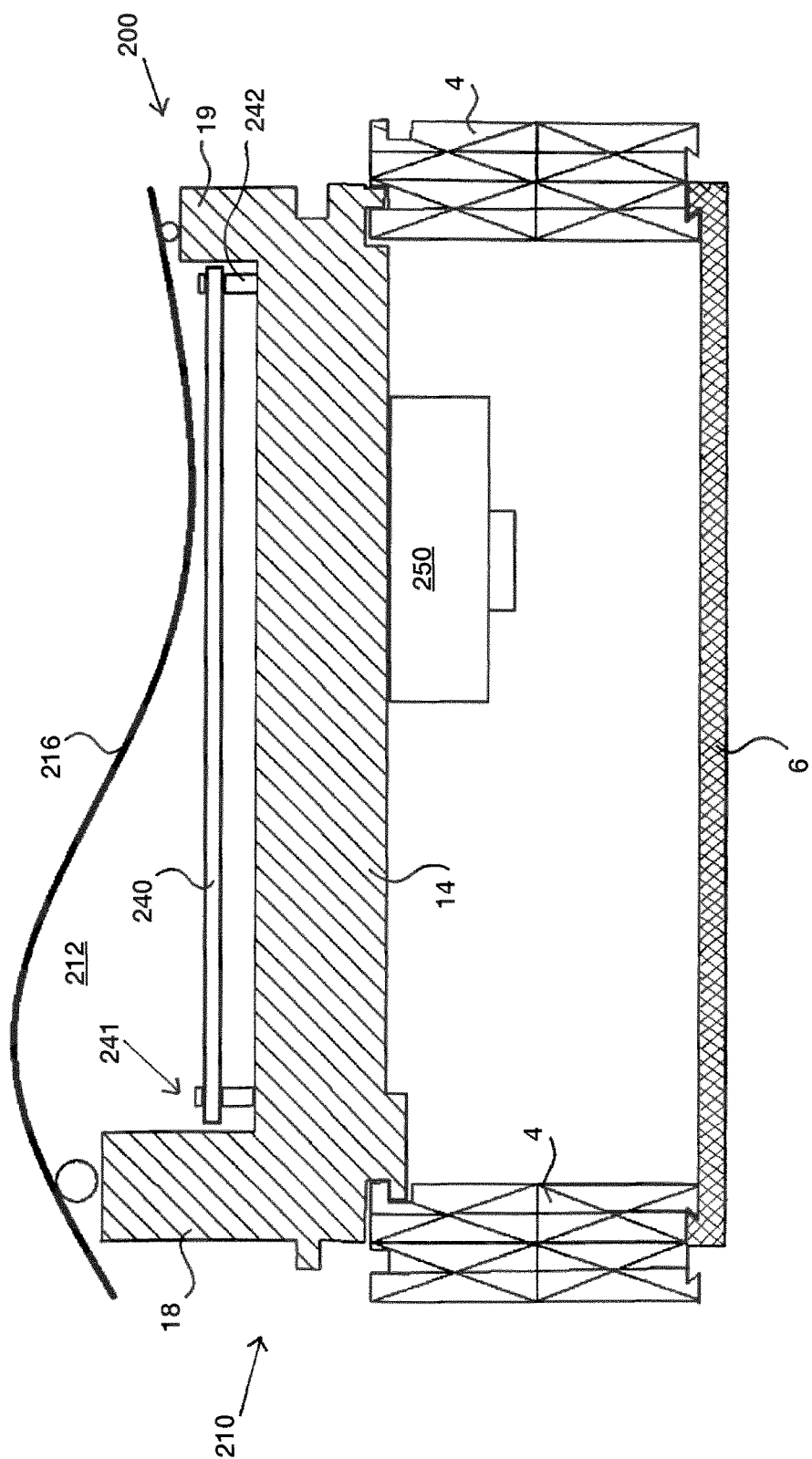
Figure 5:
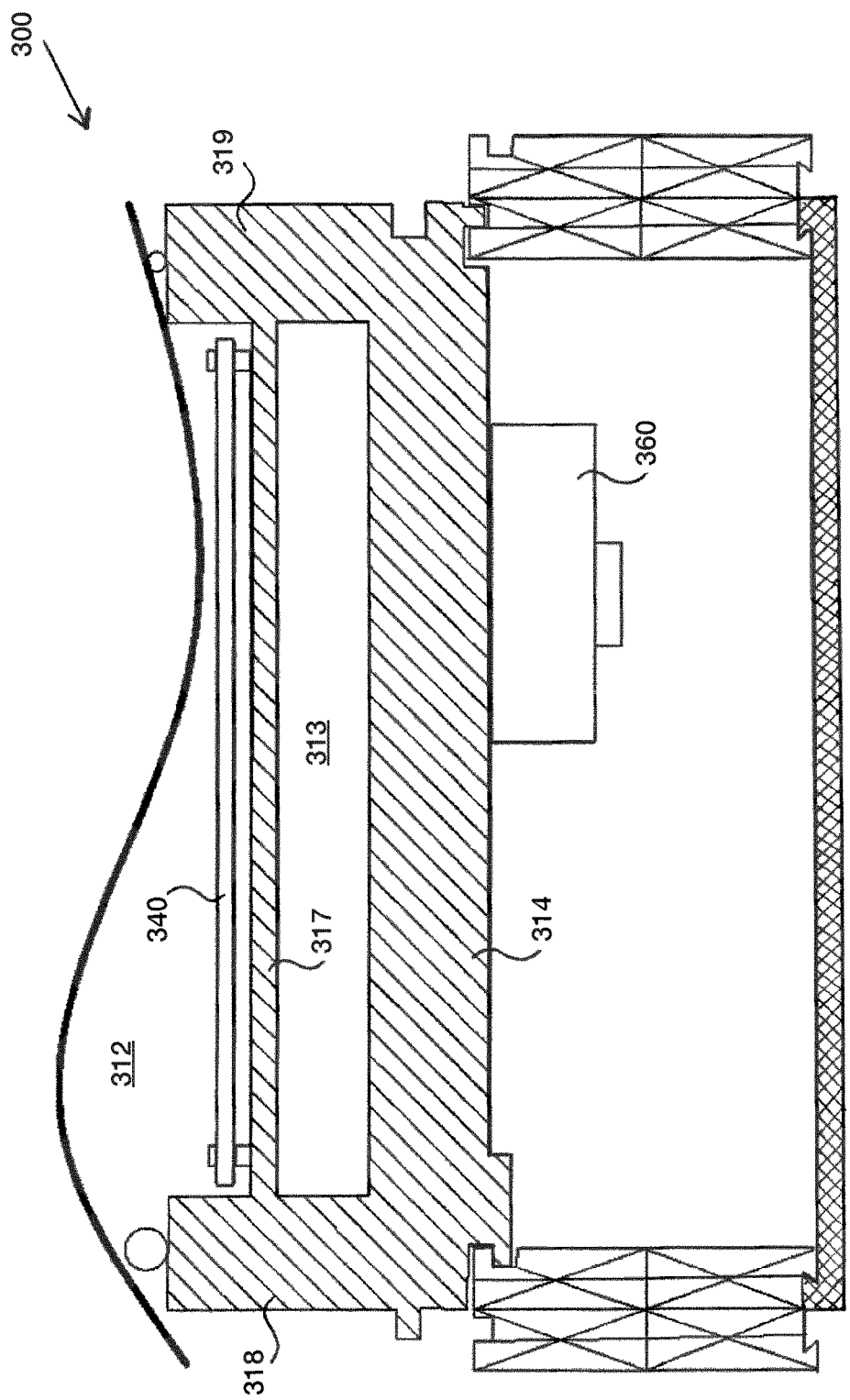
Figure 6:
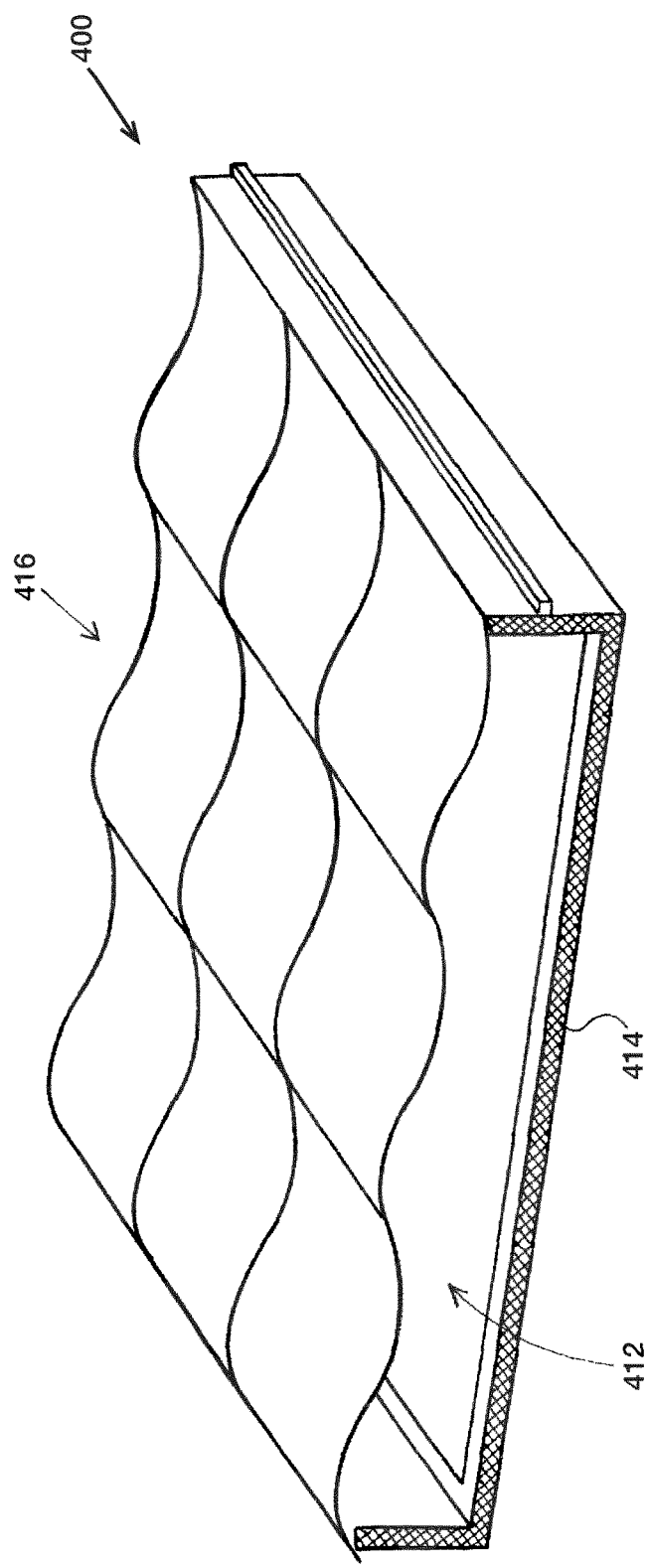
Figure 7:
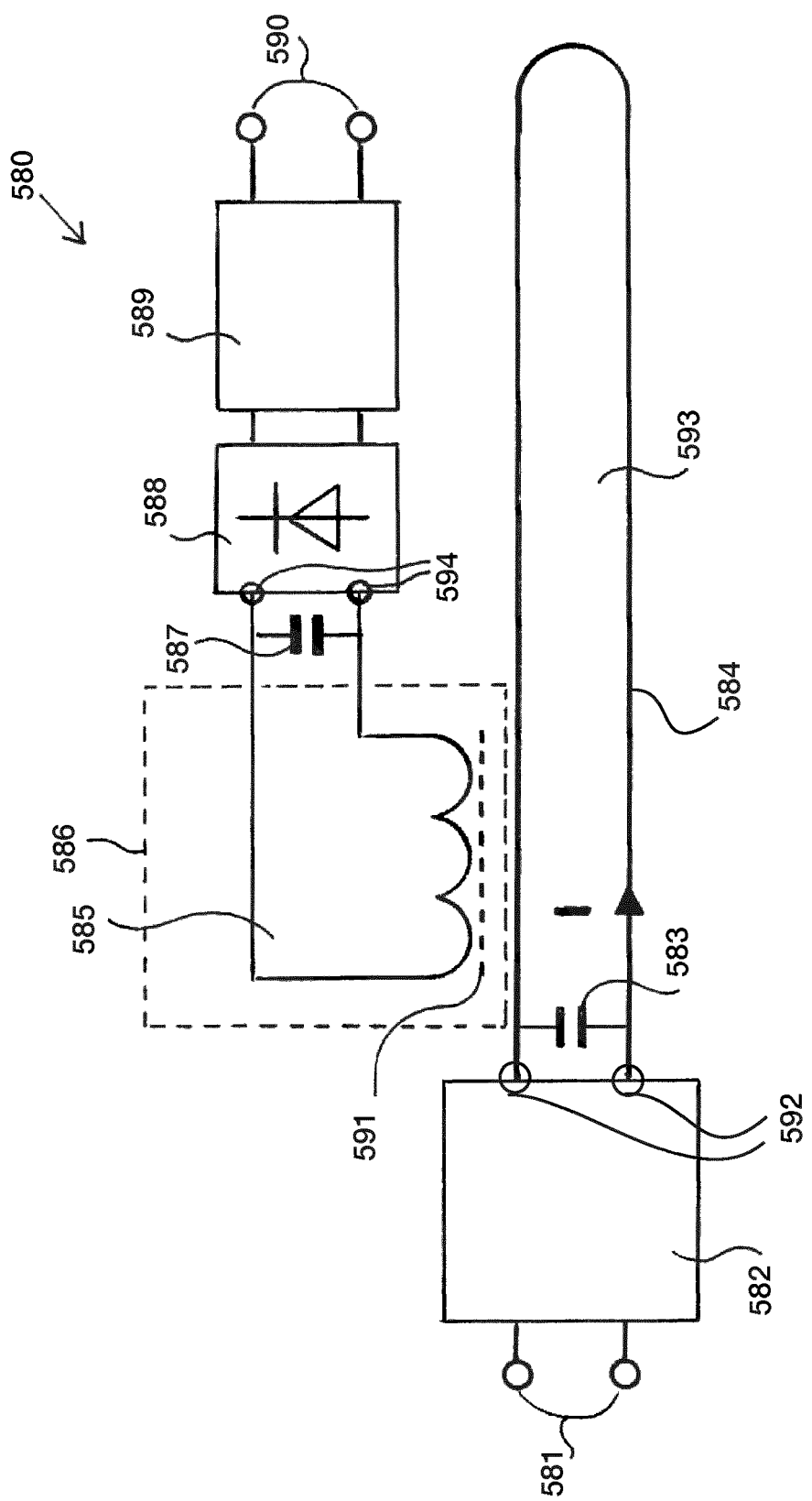
Figure 8:
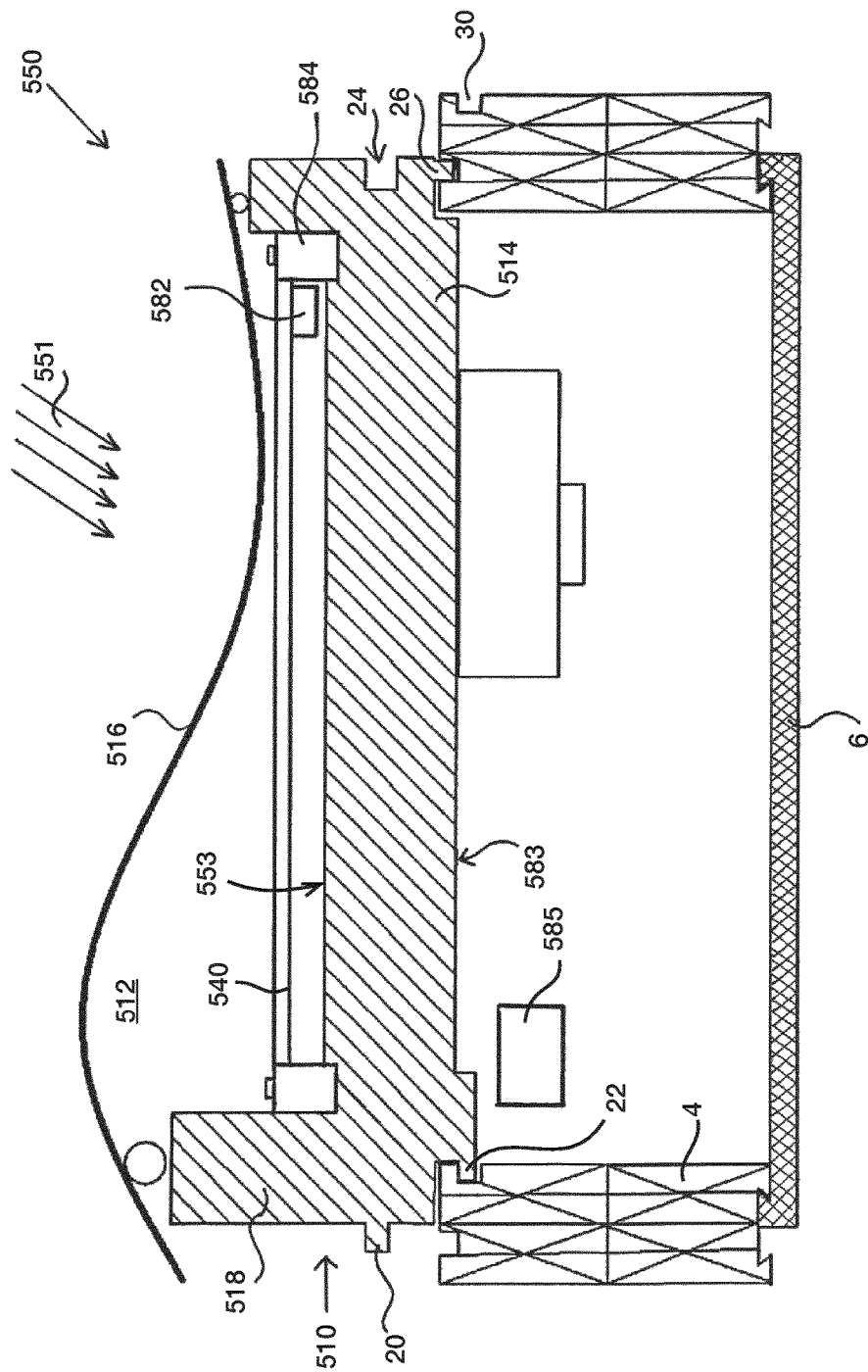
Figure 9:
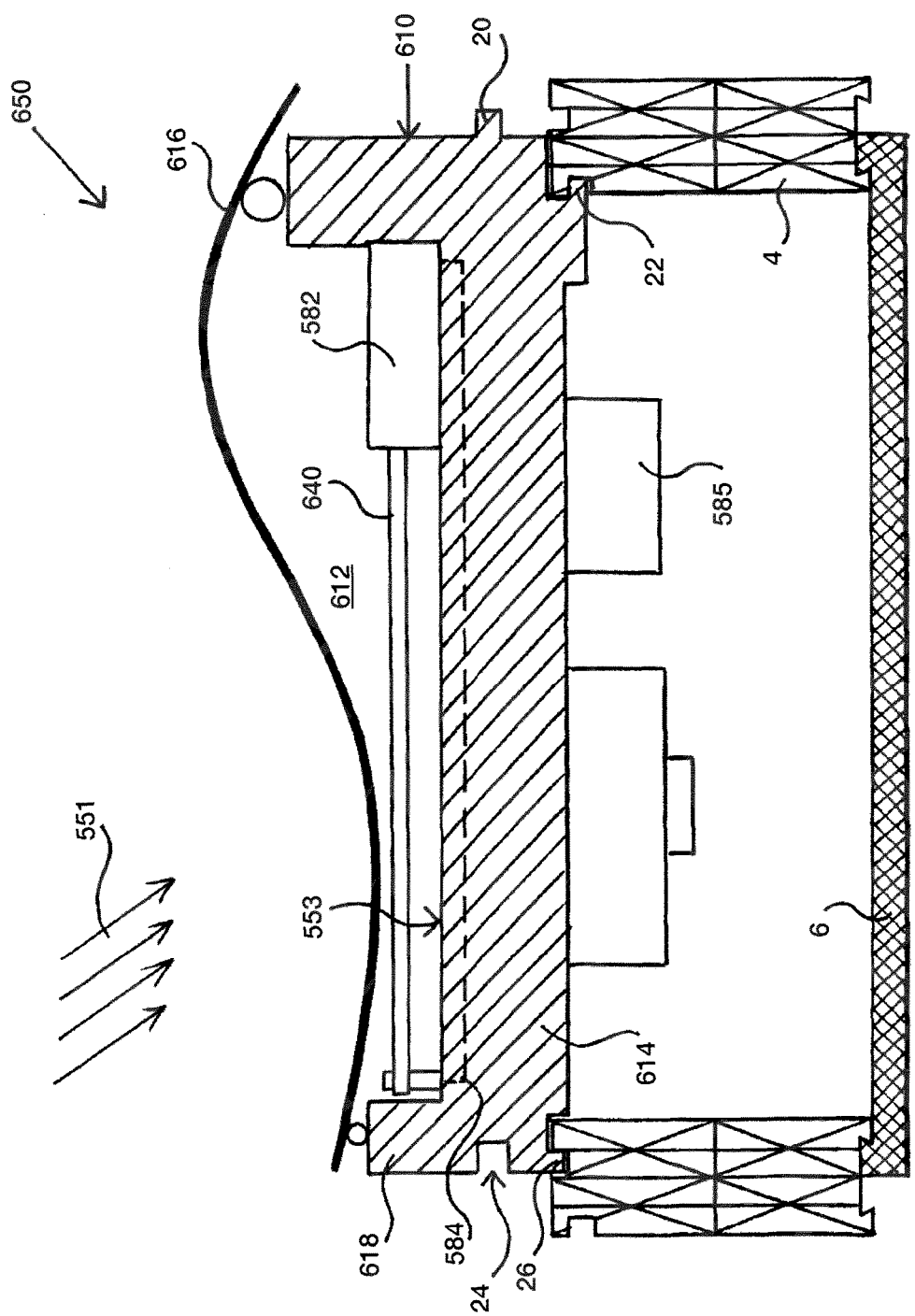

The present invention will now be explained in more detail by a description of several preferred embodiments of modular roof covering elements according to the present invention, with reference to the enclosed schematic figures, in which:

FIG. 1 shows in sectional view a first embodiment of a modular element according to the invention, FIG. 2 shows a combination of two elements as shown in FIG. 1, FIG. 3 shows in sectional view a second embodiment of a modular element according to the invention, FIG. 4 shows in sectional view a third embodiment of a modular element according to the invention, FIG. 5 shows in sectional view a fourth embodiment of a modular element according to the invention, FIG. 6 shows in sectional view a fifth embodiment of a modular element according to the invention, FIG. 7 shows a schematic view of an electrical circuit for a photovoltaic element assembly comprising the concept of inductive coupling for transferring the generated electrical power, FIG. 8 shows a sectional view of an embodiment of a photovoltaic element assembly according to the present invention, and FIG. 9 shows in sectional view of another embodiment of a photovoltaic element assembly according to the invention.

FIG. 1 shows a modular roof covering element 1. Element 1 is arranged for covering a roof 2 with a plurality of elements 1. The roof 2 comprises a plurality of mutually parallel, sloped rafters 4 which extend from a lower end of the roof 2 up to a roof ridge element such as a ridge beam. The sectional view is in transverse direction of the rafters, i.e. in horizontal direction of the roof 2. Ceiling plates 6 are mounted onto an underside of the rafters 4, which underside faces an interior of the building of which the roof 2 forms part. Between the rafters 4, above the ceiling plates 6 and below the element 1, an heat isolation element 9 is provided, for example of EPS, for increasing the isolation property of the roof 2. Use of such isolation elements 9 is optional within the scope of the present invention.

The modular roof covering element 1 comprises a box-shaped container 10 having an interior 12 and a rectangular, flat bottom wall 14 which in use faces the roof 2. The container 10 is open on an upper side. The element 1 comprises a cover 16 for covering said open upper side. The cover 16 is releasably connected to the container 10 by means of a snap connection, which is not shown in detail in the figures. Alternatively, the cover 16 may be connected to the container 10 in a permanent manner such as by plastic welding. The container 10 has on the four sides of the rectangular bottom wall 14 a side wall, of which side walls 18 and 19 are shown in FIG. 1, which side respective side wall extends upwards from the bottom wall 14 to the cover 16. The height and the shape of the upper, free edge of the respective side walls 18, 19 is configured such that each side wall 18, 19 connects to the cover 16 so that the interior 12 is fully surrounded by the bottom wall 14, side walls 18 and the cover 16. The cover 16 is shaped so as to resemble a pattern, in two directions, of roof tiles. The bottom wall 14 and side walls 18 of container 10 are formed as one piece using injection moulding, of glass fibre reinforced polypropylene. The material of the container 10 is fire retardant and heat resistant. The container 10 may in an embodiment comprise a foamed core. Alternatively the container may be made using extrusion, whereby side walls perpendicular to walls 18 and 19 may be provided as separate components fixed onto the extruded part of the container comprising the bottom wall 14 and side walls 18 and 19.

The element 1 has coupling means for coupling the element 1 to a further element 1, for covering the roof with the plurality of elements. The coupling means comprise ribs 20, 22, 26 and grooves 24. On a first side, the left side in FIG. 1, a rib 20 is provided on the left side wall 18, which rib 20 is oriented sideways. A groove 24 is provided in the side wall 19 on the right side in FIG. 1, such that in mounted condition of a plurality of elements 1 on a roof, a rib 20 engages a groove 24 of a further element 1, as is shown in FIG. 2. At the edge between the right side wall 19 and the bottom wall 14, a rib 26 is provided which extends downwards, which is arranged to engage a groove 28 in an upper side of a rafter 4. At the edge between the left side wall 18 and the bottom wall 14 a rib 22 is provided which extends sideways parallel to the rib 20. Rafters 4 are provided with a groove 30 at a side thereof. Ribs 22 are arranged to engage grooves 30. As can be derived from FIG. 2, in which two elements 1 are shown in mounted condition, upon placing the elements 1 onto a roof 2, a first, left element can be placed with its rib 22 engaging the groove 30 of rafter 4', and its rib 26 engaging the groove 28 of rafter 4". Next, a second, right element 1 can be placed by first placing it onto rafter 4" so that the ribs 20 and 22 engage with groove 24, of the left element 1, and groove 30, of rafter 4", respectively. Next, the element 1 is lowered onto rafter 4''' so that rib 26 engages groove 28 of rafter 4". This method can be repeated by placing a further element 1 on the right side of the mentioned right element 1 as shown in FIG. 2. By doing so, a form-closed interlocking coupling is provided between adjacent elements 1 and the roof rafters upon placing the plurality of elements onto a roof. A coupling between two adjacent elements 1 in the vertical, or, sloping, direction of the roof 2 can be provided by sliding a first element 1 with a portion of its cover 16 extending beyond a side wall perpendicular to side walls 18 and 19, over or under a portion of a cover 16 of a further element 1 of the plurality of elements, which also extends beyond a side wall of that further element 1 so as to realise an overlap between the respective covers of said two adjacent elements. The combinations of ribs and grooves 20, 24 and 26, 28 also form drains for draining rain water to a roof gutter. I.e. they form a seal element preventing, at least to a large extent, that fluids such as rain water may pass to underneath the elements 1.

The passage between the bottom wall 14 of the element 1 and the isolation element 9 forms, in a mounted condition of a plurality of such elements, a duct along and underneath several elements, extending parallel to the rafters 4. As a result, the PV elements within the interiors 12 of the elements 1 can be cooled using e.g. forced air, or, alternatively, by an air flow which will be present due to heated air flowing upwards through the duct towards the ridge.

A photovoltaic element (further referred to as PV element), formed by a pattern of solar cells mounted on a carrier (details not shown), is placed within the interior 12 of the element 1. Although the PV element is drawn at a small distance from the bottom wall 14, the PV element is in fact fixed onto the bottom wall 14 of the container 10 by means of an adhesive. The PV element and it's electrical configuration is further explained below with reference to FIGS. 7, 8 and 9. Due to the enclosed interior 12 of the element 1 as explained above, the PV element can be kept free from exterior influences such as moist and dirt.

The cover 16 is made of polycarbonate and is light transparent to such an extent, such as about 80 percent, that in use electrical power can be generated by the PV element due to incident sunlight.

FIG. 3 shows a modular roof covering element 100 as a second embodiment of a roof covering element according to the present invention. Identical components in comparison with element 1 are referred to with the same reference numbers. Components which are the same, at least in function, to components of element 1 as described above, are referred to with reference numbers to which 100, and increasing with another 100 per each further embodiment, is added. As shown the bottom wall 114 and side walls 118 and 119 are made thinner compared to walls 14, 18 and 19, respectively, of element 1. On top of the bottom wall 114 a heat isolation element 109 made of, for example, PUR, is placed so as to increase the isolation properties of the element 100. On top of the isolation element 109 the PV element 40 is fixed. The cover 116 may have a different or the same shape as above cover 16. This depends on the required visual appearance of the roof covering formed by the plurality of elements 1 or 100.

FIG. 4 shows a modular roof covering element 200 as an embodiment of a roof covering element according to the present invention. The element 200 is basically the same as element 1 as described above, except for the manner in which the PV element 240 is provided within the interior 212 of the element 200. PV element 240 comprises a plurality of photovoltaic cells fixed onto a flexible sheet, the sheet being suspended by means of posts 241, within the interior 212 of the container 10.

The modular roof covering element 300 according to FIG. 5 is comparable to the element 200. The container 310 of element 300 however has a through passage 313 for air, provided by an additional inner wall 317 extending between side walls 318 and 319. That means the passage 313 is not closed at the sides perpendicular to the shown side walls 318, 319 as shown. The interior 312 is however fully surrounded by the four side walls and the cover. Due to the provision of the passage 313, which in a mounted condition of a plurality of such elements 300 forms a duct though several elements 300, extending parallel to the rafters 4, the PV elements within the interiors 312 of the elements 300 can be cooled using e.g. forced air, or, alternatively, by an air flow which will be present due to heated air flowing upwards through the duct towards the ridge.

A Helmholtz resonator 360, optional within the scope of the invention, is provided at the underside of the bottom wall 314 so as to decrease any noise emission via the elements 300 to the inner side of the building covered by the roof 2 formed by the plurality of elements 300. Application of a Helmholtz resonator 250 with the above elements 1-200 is also conceivable.

FIG. 6 shows a roof covering element 400 as a fifth embodiment of a modular roof covering element according to the invention. The embodiment of FIG. 6 mainly serves to further explain the general construction of roof covering elements, in particular the cover thereof according to the invention. The cover 416 of element 400 is one integral component, shaped so as to resemble a pattern, in two directions, of roof tiles, more particularly a pattern of three by three tiles.

FIG. 7 shows a schematic view of an electrical circuit 580 for an photovoltaic element assembly comprising the concept of inductive coupling for transferring the generated electrical power.

In this example, the photovoltaic element (not shown) is connected to a micro converter 582 via input terminal 581. A photovoltaic element generally comprises a plurality of photovoltaic cells, each of which is arranged to generate a DC voltage of about 0.5 Volt. The DC voltage generated does not, usually, fluctuate heavily based on the amount of incident sun light, although it may fluctuate slightly based on the actual temperature of the assembly. The generated DC current, however, directly depends on the amount of incident sunlight on the photovoltaic cell. It is assumed that the DC current is substantially proportional to the amount of incident sunlight.

The photovoltaic cells may be arranged in series or in parallel, or a combination of both. The result thereof is that the generated voltage of the photovoltaic element assembly may differ widely. The DC voltage may, for example, vary from 20V to as high as 800V per photovoltaic element assembly. In any case, the micro converter 582 is arranged to convert any DC voltage, accompanied with a wide variation of induced DC currents, at its input 581, to an AC voltage at its output terminals 592.

The micro converter 582 may be arranged to generate any type of AC waveform, such as, but not limited to, a square waveform, a triangle waveform, a sinusoidal waveform or a sawtooth waveform.

The AC voltage is then injected to the supply coil in the form of a current track 582. Such a current track 582 is, for example, assembled in the bottom of a box-shaped container. In order to increase the efficiency of the inductive coupling, the area 593 enclosed by the current track may be enlarged by placing the current track in a circumferential direction of, and at the ends of, the bottom side of the box-shaped container. A DC coupling element 583 may be used to increase the quality of the AC waveform.

In the present example, inductive coupling is realised as the current flowing through the current track 584 induces a magnetic field and flux, which magnetic field and flux is picked up by the pickup coil 585. The picked up magnetic field and flux, by the pickup coil 585, generates an AC voltage across its output terminals 594. The pickup coil 585 may be arranged in the form of a current track or may be arranged in a single package 586.

The efficiency of the inductive coupling between the pickup coil 585 and the supply coil 584 can be increased by using a core 591. The magnetic field and flux propagate many times better through a core than through air. The core 591 may be made of a ferromagnetic material, such as iron or ferrite, as these materials are known for their magnetic conductance properties.

Next, the AC voltage at the output terminals 594 is converted via transportation means 588, 589 to a battery or battery pack for storage thereof, via its transportation terminal 590. The transportation means 588, 589 may comprise a DC converter 588 and a controller 589, for efficiently controlling the transportation of the excited energy to the battery.

FIG. 8 shows a sectional view of an embodiment of a photovoltaic element assembly 550 according to the present invention. In use, electrical power is generated by a photovoltaic element 540 as incident sunlight 540 passes through a sunlight transparent cover 16.

The photovoltaic assembly 550 comprises a box-shaped container 510, a photovoltaic element 540 having a plurality of photovoltaic cells, a supply coil 584 in the form of a current track, a micro converter 582 and a pickup coil 585. The photovoltaic element 540, the micro converter 582, and the supply coil 584 are disposed in the interior of the box-shaped container 510, while the pickup coil 585 is disposed outside the interior. The pickup coil may be mounted to the outside area 583 of the bottom wall 514 of the box-shaped container 510, or may be mounted on rafters present on a roof.

The DC voltage, generated by the photovoltaic element 540, is converted to an AC voltage, by the micro converter 582, and injected into the current track 584. The current flowing through the current track will induce a magnetic field and magnetic flux passing through the bottom wall 514 of the box shaped container 510. The magnetic field and/or the magnetic flux is picked up by the pickup coil 585, resulting in an AC voltage generated by the pickup coil 585.

In order to increase the inductive coupling efficiency between the current track 584 and the pickup coil 585, the bottom wall 514 of the box-shaped container 510 should be made as thin as possible. Alternatively, the material of the bottom wall should comprise any ferromagnetic material, such as iron, as such a material has excellent magnetic and coercivity properties.

FIG. 9 shows in sectional view of another embodiment of a photovoltaic element assembly 650 according to the invention.

The difference between the embodiments of FIGS. 8 and 9 is that the supply coil 584 in FIG. 9 is assembled in the upper side 553 of the bottom wall 614 of the box-shaped container 610. The supply coil 584 may be moulded, or may be assembled in the form of a wire coil, for example. The advantage of assembling the supply coil 584 in the upper side 553 of the bottom wall 614 is that the distance between the pickup coil 585 and the supply coil 584 is decreased, resulting in a better efficiency for the inductive coupling between them.

The present invention is not limited to the embodiments as disclosed above, and can be modified and enhanced by those skilled in the art beyond the scope of the present invention as disclosed in the appended claims without having to apply inventive skills.

The invention claimed is:

1. A roof, at least in part covered by a modular roof covering, said modular roof covering comprising a plurality of modular elements for covering said roof, wherein each modular element comprises:
   - a box-shaped container having an interior, an at least substantially flat bottom wall which in use faces the roof, and being open on an upper side, and being at least substantially made of a polymer,
   - a photovoltaic element which is disposed within the interior of the container,
   - a cover for covering said open upper side, and being connected to the container, wherein the cover is light transparent to such an extent that in use electrical power can be generated by the photovoltaic cell due to incident sunlight, and
   - interlocking coupling elements for coupling each of the modular elements to at least one of the roof or to a further modular element, for covering a roof with the plurality of modular elements, wherein the plurality of modular elements is arranged such that at least part of the roof is covered by the plurality of modular elements, and wherein each modular element is coupled via the interlocking coupling element to at least one adjacent further modular element, and the roof having sloped rafters extending mutually parallel to a roof ridge, wherein the plurality of modular elements is directly mounted onto the sloped rafters, and wherein each modular element is supported, in a direction transverse to the rafters, onto two neighboring rafters, wherein in each modular element the container has an opening in two opposite side walls extending from the bottom wall to the cover, such that in use air can flow through the container.

2. The roof according to claim 1, wherein in the modular element the cover is releasably connected to the container.

3. The roof according to claim 1, wherein in the modular element the polymer is a polyolefin.

4. The roof according to claim 1, wherein in the modular element the polymer is a reinforced polymer.

5. The roof according to claim 1, wherein the cover comprises PMMA (Poly(methyl methacrylate)), a polycarbonate, PET, polypropylene, or polyethylene.

6. The roof according to claim 1, wherein the interlocking coupling element of a modular element is configured for a form-closed coupling of the element to a further element.

7. The roof according to claim 1, wherein in the modular element the photovoltaic element comprises at least one of
   - a plurality of photovoltaic cells which are placed on an upper surface, facing the interior, of the bottom wall of the container; and
   - a plurality of photovoltaic cells fixed onto a flexible sheet, the sheet being suspended within the interior of the container.

8. The roof according to claim 1, wherein the interior of the container is fully surrounded by walls of the container and by the cover.

9. The roof according to claim 1, wherein an air gap is present in between the cover and the container.

10. The roof according to claim 1, wherein the opening in the two opposite side walls is such that in use air can flow through the interior.

11. The roof according to claim 1, wherein in the modular element the cover has, on an outer, upper side, the shape of a pattern of roof tiles.

12. The roof according to claim 1, wherein at least one modular element comprises:
   a supporting carrier having a first side and a second side, wherein said corresponding photovoltaic element is disposed on the first side of the supporting carrier and arranged for generating electrical power by a direct current voltage from the incident sunlight;
   a micro converter, connected to the photovoltaic element and arranged for converting the direct current voltage to an alternating current voltage;
   inductive coupling device, comprising:
   a supply coil connected to the micro converter, and
   a pickup coil disposed at or near the second side of the supporting carrier and inductively coupled to the supply coil for transferring the electrical power.

13. The roof according to claim 12, wherein the supporting carrier, the photovoltaic element, the micro converter and the supply coil are disposed within the interior of the box-shaped container, wherein the second side of the supporting carrier faces a bottom side of the box-shaped container.

14. The roof according to claim 13, wherein the inductive coupling device further comprises a core, wherein the core is penetrating the bottom side of the box shaped container, and wherein the supply coil is wound around the core within the interior of the box-shaped container and the pickup coil is wound around the core outside the interior of the box-shaped container.

15. The roof according to claim 13, wherein the supporting carrier, the photovoltaic element, and the micro converter are exchangeably disposed in the interior of the box-shaped container.

16. The roof according to claim 12, wherein the at least one modular element further comprises a converter connected to the pickup coil and arranged for transporting the inductively coupled electrical power.

17. The roof according to claim 16, wherein the converter is configured to convert an alternating current voltage inductively coupled to the pickup coil to a direct current voltage.

18. The roof according to claim 13, wherein the pickup coil is mounted on the bottom side of the box-shaped container.

19. The roof according to claim 1, wherein the cover is for at least covering a majority of said open upper side.

20. The roof according to claim 1, wherein the interlocking coupling elements comprise a rib, a groove, or a combination comprising at least one of the foregoing.

* * * * *